United States Patent [19]

Oishi

[11] Patent Number: 4,840,760
[45] Date of Patent: Jun. 20, 1989

[54] MANUFACTURING METHOD FOR MAGNETIC TAPE CASSETTE

[75] Inventor: Kengo Oishi, Kanagawa, Japan

[73] Assignee: Fuji Photo Film Co., Ltd., Kanagawa, Japan

[21] Appl. No.: 149,321

[22] Filed: Jan. 28, 1988

[30] Foreign Application Priority Data

Jan. 28, 1987 [JP] Japan .................. 62-16202

[51] Int. Cl.$^4$ .................. B29C 45/04; B29C 45/16
[52] U.S. Cl. .................. 264/245; 264/1.7; 264/246; 264/255; 264/328.7; 264/328.8; 264/328.12
[58] Field of Search .................. 264/328.7, 328.12, 1.7, 264/328.8, 245, 246, 255

[56] References Cited

U.S. PATENT DOCUMENTS 3,822,107 7/1974 Wogerer .................. 264/245 X
4,726,758 2/1988 Sekine et al. .................. 264/245 X

FOREIGN PATENT DOCUMENTS 2572676 5/1986 France .................. 264/328.8

Primary Examiner—Jan H. Silbaugh
Assistant Examiner—Kelley M. Sidwell
Attorney, Agent, or Firm—Sughrue, Mion, Zinn, Macpeak & Seas

[57] ABSTRACT

A method of manufacturing a magnetic tape cassette by using a molding die having a fixed part and a second part including a submarine gate and a plurality of movable cores. The method includes the steps of defining an initial opening in the molding die between the fixed part and the movable cores, filling a molten plastic for molding the body of the cassette into the initial opening in the molding die, selectively moving the plurality of cores to change the size of the initial opening to define a new opening connected to the submarine gate, and filling the new opening through the submarine gate with a molten plastic different from the plastic already filled into the initially formed opening in order to mold the body in a plurality of colors.

3 Claims, 3 Drawing Sheets

MANUFACTURING METHOD FOR MAGNETIC TAPE CASSETTE

BACKGROUND OF THE INVENTION

The present invention relates to a method of manufacturing a magnetic tape cassette, and particularly relates to a method of manufacturing a magnetic tape cassette, the half parts of the body of which are manufactured by plural-color molding.

In a conventional magnetic tape cassette for an audio or video equipment or the like, a pair of hubs on which a magnetic tape is wound are rotatably supported in the cassette body. The body is made of upper and lower half parts, each of which are usually manufactured by the injection molding of a plastic or the like. The body is provided with one or more transparent or semitransparent windows through which the wound state of the magnetic tape or the like can be seen from outside. Even if the whole cassette body is made of an optically transmissive material, the windows are often separately made of another optically-transmissive material. In that case, the windows are set at a higher optical transmissivity than the cassette body itself to more surely perform the proper function of each of the windows. The windows may be shaped in desired forms to produce a design effect.

Each of the windows is manufactured by bonding a separate window member to the cassette body through the use of an adhesive, through a process of ultrasonic welding or the like. However, there is a drawback in that it is necessary to separately manufacture the window member and thereafter to bond it to the cassette body. If the cassette body is made of the same optically transmissive material, there is another drawback in that the bonded portion of the cassette body is so visible as to deteriorate the appearance thereof.

In order to eliminate such drawbacks, a method of manufacturing a magnetic tape cassette through two-color molding has been adopted recently. However, providing the window using the two-color molding method also creates problems. When one or more windows having a relatively complicated form are to be provided, as illustrated by windows 3a and 3b of FIG. 6, cores having the same forms as the windows are moved in the direction of the thickness of the body 2 of the cassette, after the injection molding of the cassette body, so that openings having the same forms as the windows are defined. A plastic for molding the windows is then injected in the direction of the thickness of the cassette body 2 through a direct gate or the like. At that time, slender intermediate portions already molded in the body, such as portion 2a located between the openings 3a and 3b, undergo deformation or color change due to the pressure or heat of the plastic injected into the openings, so that a desired form or appearance cannot be obtained. Countermeasures, such as limiting the movement of the cores so as to hold the slender intermediate portion 2a to prevent it from undergoing the deformation or color change, have been taken in order to solve the problem. However, such countermeasures restrain the form or design of the windows 3a and 3b greatly.

SUMMARY OF THE INVENTION

The present invention was made in order to solve the above-mentioned problems.

Accordingly, it is an object of the present invention to provide a method of manufacturing a magnetic tape cassette without causing deformation, color change or the like, even if the cassette has a plurality of adjacent windows or has a window of complicated form.

In the method of manufacturing the magnetic tape cassette, a molten plastic for molding the body of the cassette is filled into an initially formed opening in a molding die, a plurality of cores movable to change the size of the opening are thereafter moved to define a new opening connected to a submarine gate, and a molten plastic different from the already filled plastic is filled into the new opening through the submarine gate, so as to mold the cassette body in a plurality of colors. Even if the cassette has the plurality of windows or has a window of complicated form, it is easy to inject the plastics. According to the method, the magnetic tape cassette can be manufactured very accurately and easily even if the cassette has the plurality of windows or has a window of complicated form.

DETAILED DESCRIPTION OF PREFERRED EMBODIMENTS

Embodiments of the present invention are hereafter described in detail with reference to the drawings attached hereto.

Figure 1:
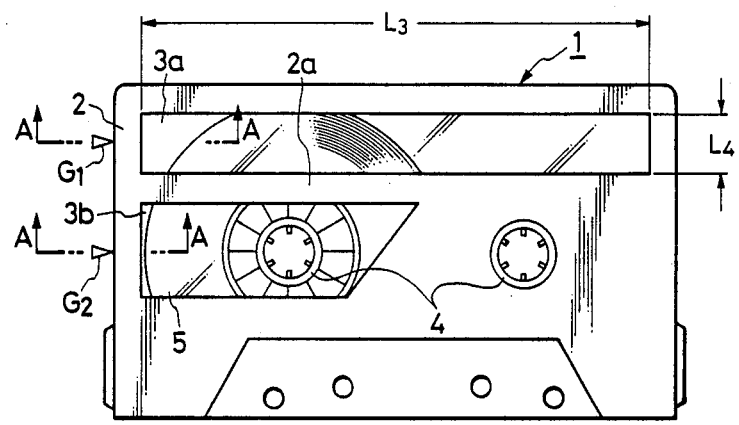
FIG. 1 shows a plan view of a magnetic tape cassette manufactured in accordance with the present invention.

FIG. 1 shows a plan view of a magnetic tape cassette 1 manufactured in accordance with the present invention. The magnetic tape cassette 1 is for conventional audio equipment or the like. It has a body 2 made of an upper half part (shown) and a lower half part (not shown) combined together. A pair of hubs 4 on which a magnetic tape 5 is wound are rotatably supported in the body 2 of the cassette 1. The cassette body 2 is conventionally made of a plastic having a first color. Windows 3a and 3b are made of plastic having a second color, in accordance with the present invention. Window 3a is shown to have a rectangular shape with dimensions $L_3$ and $L_4$ Window 3b, which is separated from window 3a by a narrow portion of the body 2a, has an irregular shape.

Figure 2:
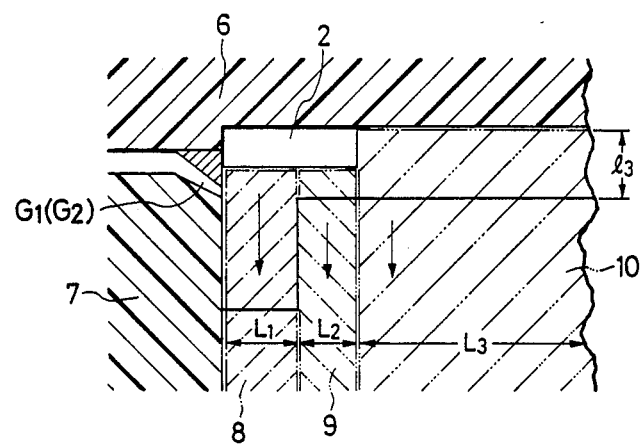
FIG. 2 shows a sectional view of a major part of a molding die to describe the first step of a magnetic tape cassette manufacturing method which is an embodiment of the present invention.
Figure 3:
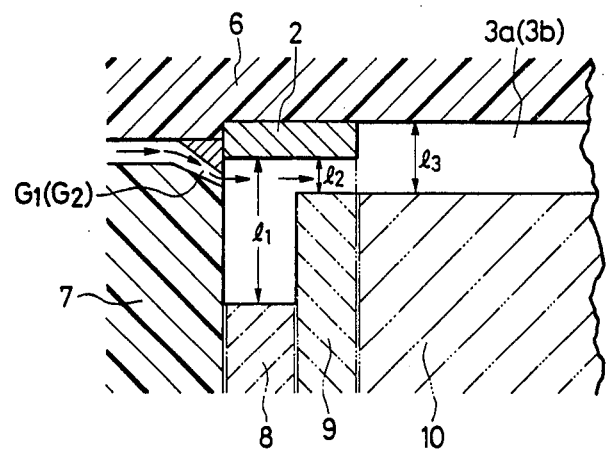
FIG. 3 shows a sectional view of the major part of the molding die to describe the second step of the method.

FIGS. 2 and 3 show sectional views of a portion of a molding die for manufacturing the upper half part of the cassette body 2 in a method which is one of the embodiments. The sectional views are along lines A—A shown in FIG. 1. FIG. 2 indicates the first step of the method. FIG. 3 indicates the second step of the method.

As shown in FIG. 2, the molding die can be divided into a fixed part 6 and a movable part 7. Three cores 8, 9 and 10 are provided in the movable part 7 to make the window 3a. The cores 8, 9 and 10 are juxtaposed in the longitudinal direction of the upper half part of the body 2 of the magnetic tape cassette 1. A first core 10 has the same dimensions as window 3a (such as $L_3$ and $L_4$ shown in FIG. 1) and forms the window 3a. A second core 10, having the same dimensions as window 3b would be located behind the first core 10 and would be used to form the window 3b. The dimension $L_1$ of the core 8 in the longitudinal direction of the half part of the cassette body 2 is equal to the thickness of the side wall of the upper half part, and the dimension of the core 8 in the direction of the thickness of the whole cassette body is sufficient to connect a submarine gate $G_1$ to an opening when the core 8 is moved backward. The cross-sectional form of the core 8 is rectangular. The dimension $L_2$ of the core 9 in the longitudinal direction of the cassette body 2 is equal to the distance between the cores 8 and 10, and the dimension of the core 9 in the direction of the thickness of the whole cassette body 2 is equal to or more than that of the core 8 in the same direction. The cross-sectional form of the core 9 is rectangular. The cores 8, 9 and 10 are disposed to correspond to submarine gates $G_1$ and $G_2$.

In the first step of the method, a molten first plastic, which is an optically untransmissive plastic, is injected into the molding die while the cores 8, 9 and 10 are located as shown in FIG. 2. During this step, the core 8 closes the submarine gate $G_1$ and maintains an appropriate gap with respect to the fixed part 6 of the molding die. As seen in FIG. 2, the front surfaces of the cores 8 and 9 are flush with each other, and the front surface of the core 10 is in contact with the fixed part 6 of the molding die. Accordingly, the injected first plastic is filled into an opening defined by the molding die and the cores to make the cassette body 2 except the windows 3a and 3b. Although a gate for injecting the first plastic is not shown in the drawings, the gate is provided in an appropriate position in the fixed part 6 of the molding die.

After the first plastic injected into the molding die has adequately solidified, the cores 8, 9 and 10 are moved backward in the direction of the thickness of the whole cassette body in the second step of the method. At that time, the core 8 is moved by a length $l_1$ to the rear end of the side wall of the cassette body 2, the core 10 is moved by a length $l_3$ in order to make the thickness of the window 3a nearly equal to that of the cassette body 2, and the core 9 is moved by a length $l_2$ in order to make the front surfaces of the cores 9 and 10 flush with each other. New openings, which are defined simultaneously by the backward movement of the cores 8, 9 and 10, communicate with the submarine gates $G_1$ and $G_2$. A second plastic, which is an optically-transmissive plastic, is injected into the new openings through the submarine gates $G_1$ and $G_2$ to mold the windows 3a and 3b to finish manufacturing the upper half part of the cassette body 2. Since the second plastic flows into the new openings in the longitudinal direction (in the rightward direction as to FIG. 3), the pressure of the flow of the second plastic is lower than that of a plastic injected in the direction of the thickness of the cassette body through a direct gate extending downward. For that reason, a slender intermediate portion 2a which is located between the windows 3a and 3b as shown in FIG. 1 and is low in mechanical strength is prevented from undergoing irregular coloring, deformation or the like due to the pressure of the flow of the second plastic.

Accordingly, the half part of the cassette body 2 is molded in a desired manner even if each of the windows has a relatively complicated form. Since no traces of the gates are made at the windows 3a and 3b, the appearance of the magnetic tape cassette is good.

Figure 4:
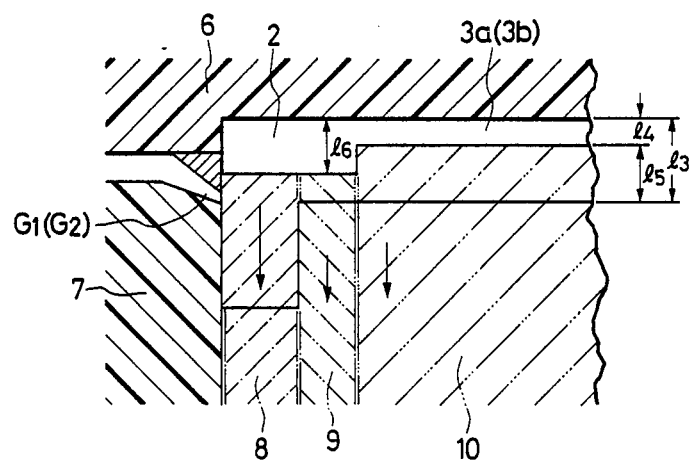
FIG. 4 shows a sectional view of a major part of a molding die to describe the first step of a magnetic tape cassette manufacturing method which is a second embodiment of the present invention.
Figure 5:
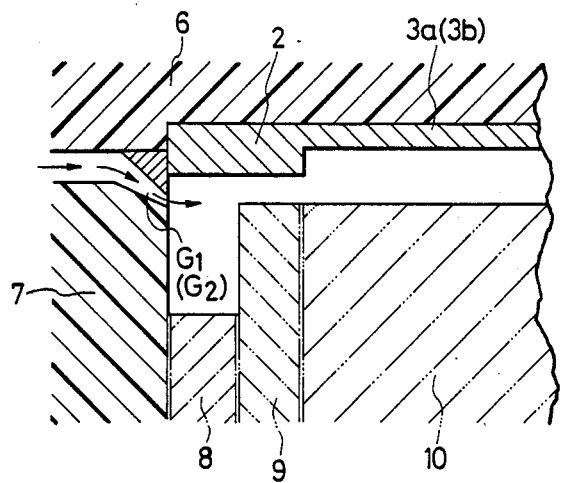
FIG. 5 shows a sectional view of the major part of the molding die to describe the second step of the method which is the second embodiment.
Figure 6:
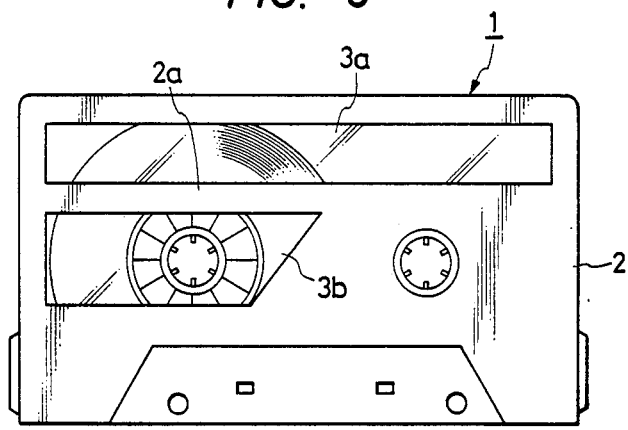
FIG. 6 shows a plan view of a conventional magnetic tape cassette.

The present invention is not confined to the method having the first and the second steps as shown in FIGS. 2 and 3 but may be otherwise embodied in various ways. For example, the present invention may be embodied as a method of manufacturing a magnetic tape cassette as shown in FIGS. 4 and 5. This method is a second embodiment.

FIGS. 4 and 5 show sectional views of a portion of a molding die in the same perspective as FIGS. 2 and 3. The same cores 8, 9 and 10 as those shown in FIGS. 2 and 3 are used in the method shown in FIGS. 4 and 5. In the method, two kinds of plastics, which are both optically transmissive but different in optical transmissivity or color, are used.

In the first step of the method shown in FIGS. 4 and 5, the first plastic is injected into the molding die as the cores 8, 9 and 10 are away from the fixed part 6 of the die as shown in FIG. 4, so that the front portion of the half part of the body of the magnetic tape cassette and the front portions of windows 3a and 3b are made of the first plastic. There is a distance $l_6$ between the fixed part 6 of the molding die and each of the cores 8 and 9 and a distance $l_4$ between the fixed part 6 and the core 10. The two dimensions have the relationship $l_6 > l_4$, as shown in FIG. 4, in order to produce a desired design effect.

After the first plastic is injected into the molding die, the cores 8, 9 and 10 are moved backward to positions shown in FIG. 5, in the second step of the method, to define new openings. The second plastic is thereafter injected into the new openings through submarine gates $G_1$ and $G_2$ so that the windows 3a and 3b are made of two layers. Since a slender intermediate portion 2a between the windows 3a and 3b is sufficiently coupled to the window portions made of the first plastic at a thickness of $l_4$, the slender intermediate portion 2a is reinforced so that it is not deformed by the pressure of the flow of the second plastic injected into the new openings in the molding die.

The windows 3a and 3b can be provided with a good seeing-through property by making the optical transmissivity of the second plastic higher than that of the first plastic. Besides, a very good design effect can be produced by only making the first and the second plastics different from each other in color.

Although the upper half part of the body of the magnetic tape cassette is molded in two colors in each of the above-described embodiments, the present invention is not confined thereto but may be otherwise embodied to mold either half part in more than two colors, use a different number of cores of different forms, mold the half part of the body of any other type of tape cassette.

I claim:

1. A method of manufacturing a magnetic tape cassette, by using a molding die comprising a fixed part and a second part including a submarine gate and a plurality of movable cores, said method comprising the steps of;

defining an initial cavity in said molding die between said fixed part and said moveable cores, said cavity having a specific size for forming a body of said cassette;

filling a molten plastic for molding said body of said cassette into said initial cavity in said molding die;

selectively moving said coles to define new cavities for at least two windows, said windows being separated by an intermediate portion of said cassette body and formed in the longitudinal direction thereof, said cavities being connected to said submarine gate; and injecting a molten optically-transmissive plastic into said new cavities in the molding die through the submarine gate in a longitudinal direction along said intermediate portion already molded from the other plastic whereby pressure of said optically-transmissive plastic is lower than flow pressure of said other plastic; and flow of said optically-transmissive plastic is in said longitudinal direction, so that deformation of said intermediate portion due to stress is prevented during said filling of said new cavities.

2. A method according to the claim 1, in which the plastic injected into the initial cavity in said molding die during said filling step is an optically-transmissive plastic and forms a peripheral portion of the body of the magnetic tape cassette; said plastic injected into said new cavities through the submarine gate is an optically-transmissive plastic different in optical transmissivity from the former; and each of the windows is made of a plurality of layers molded from said plastics.

3. The method according to claim 1 in which one of said window forming cores prevents any flow of said molten plastic between said fixed part and said window forming core during said filling of said initial cavity.

* * * * *